Patented Oct. 31, 1950

2,528,429

UNITED STATES PATENT OFFICE 2,528,429

DRIER COMPOSITION FOR PAINTS AND THE LIKE

Stanley B. Elliott, Cleveland, and Raymond J. O'Hara, Bedford, Ohio, assignors to Ferro Chemical Corporation, Cleveland, Ohio, a corporation of Ohio No Drawing. Application May 17, 1946, Serial No. 670,517

18 Claims. (Cl. 106—310)

This invention relates as indicated to stabilized solutions of metallic salts, and more particularly to solutions used in or as paints and in which the metallic salts are used as driers.

These driers are generally, in their pure state, solids so that their commercial occurrence are in the form of liquid solutions in mineral spirits. These solutions are then added to the appropriate paint or varnish base, and it is accordingly a further requisite of such solutions that they be capable of incorporation in the paint body by a simple mixing operation.

In order to be thus capable of ready admixture with the paint or varnish body, the driers, with a minimum amount of a solvent such as mineral spirits, should have a relatively low viscosity so as to reduce to a minimum the time and effort required for blending in such body.

The driers, either before or after admixture with the paint or varnish vehicle in which they are designed for use, come in contact with minor amounts of water present generally as a foreign material in the container. Such water generally results in a decomposition of the driers, unless some stabilizing addition agent is used.

It is, therefore, a principal object of this invention to provide stabilizing agents which are effective not only to thus prevent decomposition, but which also decrease the viscosity of the solution of the drier, so that a maximum metal content may be incorporated in the ultimate paint or varnish composition with a minimum of mixing time and effort.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises the provision of a drier composition which comprises a soap of a drying metal and a stabilizer therefor, comprising a compound of phosphorus selected from the class consisting of substituted acids of phosphorus containing an organic substituent and salts of substituted acids of phosphorus containing an organic substituent.

THE DRIERS

The class of driers to which this invention is applicable are drier metal salts of certain organic acids. These drier salts to be used are preferably water-insoluble. The metals which may be used in the preparation of such salts include the following:

Table 1

Heavy metals:
    Iron*
    Lead*
    Copper
    Zinc*
    Cadmium
    Manganese*
    Mercury
    Cobalt*
    Chromium
    Nickel
Alkaline earth metals:
    Calcium
    Barium
    Strontium The ones marked thus (*) are preferred for various reasons such as their cost, commercial availability, and general effectiveness. In general, the metals thus marked are effective as drier metals when used alone. The other listed metals, while not as effective as drier metals when used alone, nevertheless are effective as such when used in conjunction with one of the marked metals. It is accordingly within the contemplation of my invention to employ a combination of a marked metal with one or more of the other metals, or, more accurately, salts of such metals as drier compounds in the compositions comprising my invention.

The acids which may be used with any of the metals given in Table 1 above in the preparation of the metallic salts or soaps which comprise the driers of this invention include the following representative acids:

Table 2

Aliphatic acids:
    Saturated acids—
        Stearic acid
        Palmitic acid
        Lauric acid
    Unsaturated acids—
        Linoleic acid
        Linolenic acid
        Oleic acid
Cycloaliphatic acids:
    Naphthenic acid
Complex acids:
    Rosin oil acids
    Rosin acids
    Tall oil acids Commercially available acids which are, in many cases, mixtures of certain of the above named, together with small amounts of other acids, are generally useful in the preparation of the driers of this invention.

Any one or more of the metals previously identified may be used with any one or more of the acids named above in the preparation of driers which form one component of the compositions of this invention. For best results, however, only those resultant salts or soaps which are soluble in a non-polar solvent such as any of the following, viz:

*Table 3*

| | |
|---|---|
| Xylene | Stoddard's solvent |
| Benzene | V. M. and P. naphtha |
| Toluene | Mineral spirits | should be used.

In the following table are given a number of specific examples of driers which will be found highly useful, and to which this invention particularly relates:

*Table 4*

| | |
|---|---|
| Cobalt naphthenate | Lead tallate |
| Cobalt linoleate | Lead naphthenate |
| Manganese naphthenate | Copper napthenate |
| Manganese linoleate | Copper tallate |
| Cobalt tallate | Lead oleate |
| Manganese tallate | |

THE STABILIZERS

The stabilizers employed in conjunction with and for the purpose of stabilizing the aforementioned drier soaps may be defined as a compound of phosphorus selected from the class consisting of substituted acids of phosphorus containing an organic substituent and salts of substituted acids of phosphorus containing an organic substituent.

In the following table are listed a number of representative examples of acids of phosphorus.

*Table 5*

Acids of phosphorus
   Oxy acids of phosphorus
      Hypo phosphorous
      Phosphinic
      Phosphorus
      Phosphonic
      Orthophosphoric
      Metaphosphoric
      Pyrophosphoric
      Polyphosphoric
   Thio acids of phosphorus
      Thio-hypo phosphorous
      Thio-phosphinic
      Thio-phosphorus
      Thio-phosphonic
      Thio-orthophosphoric
      Thio-metaphosphoric
      Thio-pyrophosphoric
      Thio-polyphosphoric These acids of phosphorus are preferably not used as such but are instead first partially esterified so as to replace some but not all of the available replaceable acid hydrogen atoms. After the particular acid selected for use has been thus partially esterified, producing an acid ester of a substituted acid of phosphorus containing an organic substituent, such acid ester may be used as such since, when it is admixed with the previously referred to drier soaps, reaction thereof with such soaps will satisfy or replace the remaining acid hydrogens on the acid ester molecule to an extent sufficient to establish equilibrium.

For certain purposes, however, the acid ester prepared in the manner indicated above may be neutralized completely before use by replacing all of the remaining acid hydrogens with a salt forming element or radical. The salt forming radicals which may be employed for this purpose may be of the type given in the following table:

*Table 6*

Inorganic Bases, e. g.,
   Heavy metals
      Cobalt
      Manganese
      Copper
      Lead
   Alkaline earth metals
      Calcium
      Barium
   Alkali metals
      Sodium
      Potassium
Organic Bases, e. g.,
   Amines
      Isopropanol amine
      Isopropyl amine
      Tri-ethanol amine
      Butyl amine In the first esterification step, i. e., in the preparation of the acid ester, it will be noted that certain of the acids of phosphorus indicated as useful in this invention are ones in which the only replaceable hydrogen atoms are acid hydrogens. When partially esterifying such acids in the preparation of acid esters therefrom, it is preferable to use an alcohol higher than ethyl since the very short chain alcohols produce compounds which are relatively insoluble in mineral hydrocarbons which are usually used as the solvents for driers of the character to which this invention relates. It will be noted, however, that certain of the acids of phosphorus which may be utilized contain non-acidic replaceable hydrogens and when utilizing such acids it is within the contemplation of my invention to substitute such non-acidic hydrogens with a mineral hydrocarbon solubilizing radical such as the following:

*Table 7*

Alkyl radicals
   Methyl
   Ethyl
   Propyl
   Butyl
   Amyl
   Hexyl
   Heptyl
   Octyl
   Decyl
   Lauryl
      and other long chain alkyl radicals
Aryl radicals
   Phenyl
   Xenyl
   Naphthyl
   Anthracyl
   Phenanthryl
Cyclo-alkyl radicals
   Cyclopentyl
   Cyclohexyl
   Cycloheptyl
   Cyclohexyl-cyclohexyl Alkylated aryl radicals
  Cresyl
  Xylyl
  Trimethyl-phenyl
  Ethyl-phenyl
  Diethyl-phenyl
  Tetraethyl-phenyl
  Propyl-phenyl
  Tert.-butyl-phenyl
  Tert.-amyl-phenyl
  Octyl-phenyl
  Lauryl-phenyl
  Cetyl-phenyl
  Ceryl-phenyl
  Methyl-naphthyl
  Iso-propyl-naphthyl
  Tert.-amyl-naphthyl
  Octyl-naphthyl
  Lauryl-naphthyl
  Cetyl-naphthyl Arylated-alkyl radicals
  Radicals formed by the arylation of alkyl radicals, such as those listed above with any aryl radical, such as those listed above.

Specific examples of arylated-alkyl radicals are as follows:

| | |
|---|---|
| Benzyl | Xenyl-methyl |
| Phenyl-ethyl | Xenyl-ethyl |
| Phenyl-amyl | Naphthyl-methyl |
| Phenyl-lauryl | Naphthyl-ethyl |
| Phenyl-cetyl | |

When the acid of phosphorus used contains a replaceable non-acidic hydrogen which may be substituted with a solubilizing radical of the type listed above so as to impart sufficient oil-solubility to the molecule, then the extremely short chain alcohols may be employed for the purpose of producing the acid ester, i. e., to replace part of the acid hydrogens.

While alcohols higher than ethyl produce satisfactory solubility and while any of the higher alcohols may be used, nevertheless for reasons of economy, amyl alcohol is usually preferred. Since the longer chain alcohols apparently have no greater solubilizing effect than amyl alcohol for example, and since one pound of amyl alcohol is effective to esterify a larger number of molecules of the acid than is a pound of a higher alcohol, for reasons of economy, the short chain alcohols such as amyl alcohol will usually be found preferable.

Specific examples of stabilizers which have been found particularly effective for use are the following:

*Table 8*

Dioctyl acid pyrophosphate
Mono-octyl acid orthophosphate
Dicresyl phenyl phosphonate
Mono-amyl acid orthophosphate
Mono-butyl acid orthophosphate As previously indicated, it is within the contemplation of this invention to employ the acid esters of the substituted acids of phosphorus containing an organic substituent since when admixed with the drier soaps reaction thereof with such soaps will satisfy or replace the remaining acid hydrogen on the acid ester molecule. Instead of such procedure, it is also within the contemplation of our invention to utilize a preformed soap of such acid esters when the metal of such soap is one of the drier metals and particularly one of the preferred drier metals marked (*).

In other words, it is within the contemplation of this invention to utilize any of the acids of phosphorus given in Table 5 from which first an acid ester will be prepared in accordance with the particulars given above, after which a metallic salt will be prepared from the acid ester by the use of any of the drier metals. One such material which has been found to be of particular utility is Cobalt (Di-Octyl Acid Ortho Phosphate)$_2$. When thus the drier metal is combined with the acid of phosphorus, there is produced a single paint addition agent which may be used as such on account of its drying properties and inherent stability.

In general, the drier soap and the phosphorus containing stabilizer will be employed in relative proportions of from 2 to 12 parts per 100 parts of drier soap. The admixture of the drier soap and stabilizer is generally prepared as a solution in a light hydrocarbon solvent utilizing materials such as mineral spirits, V. M. and P. naphtha, xylene. Solutions as made up for commercial use will generally consist on the order of about 50% by weight of solvent, and about 50% by weight of the drier soap-stabilizer admixture. This solution is then used in paints and the like in concentrations ranging from 1 to 4% by weight on the basis of drying oil present in the paint or varnish.

Throughout the foregoing description and in the appended claims, wherever reference is made to a paint, we intend to include coating compositions generally, as for example those materials customarily called paints, as well as those materials customarily called varnishes, and also that class of compositions which are known in the trade as inks, since all of these materials require the use of a drier and hence the principles of our invention are applicable thereto.

Other modes of applying the principle of the invention may be employed, change being made as regards the details described, provided the features stated in any of the following claims or the equivalent of such be employed.

We, therefore, particularly point out and distinctly claim as our invention:

1. As a new composition of matter, an admixture of a soap of a drier metal and a compound of phosphorus selected from the class consisting of acids of pentavalent phosphorus in which at least one hydrogen is esterified by an alcohol and there is at least one free acid-hydrogen, and salts of acids of pentavalent phosphorus in which at least one hydrogen is esterified.

2. As a new composition of matter, an admixture of a soap of a drier metal and an acid of pentavalent phosphorus in which at least one hydrogen is esterified by an alcohol and there is at least one free acid-hydrogen.

3. As a new composition of matter an admixture of a soap of a drier metal and a salt of an acid of pentavalent phosphorus in which at least one hydrogen is esterified.

4. As a new composition of matter an admixture of a soap of a drier metal and a metallic salt of an acid of pentavalent phosphorus in which at least one hydrogen is esterified.

5. As a new composition of matter an admixture of a soap of a drier metal and an organic salt of an acid of pentavalent phosphorus in which at least one hydrogen is esterified.

6. A drier comprising a soap of a metal selected from the class consisting of lead, manganese, cobalt, zinc and iron, a soap of a metal selected from the class consisting of calcium, copper, cadmium, nickel, barium, strontium and chromium and from about 2 to 12 parts per 100 parts of total soap of a compound of phosphorus selected from the class consisting of acids of pentavalent phosphorus in which at least one hydrogen is esterified by an alcohol and there is at least one free acid-hydrogen, and salts of acids of pentavalent phosphorus in which at least one hydrogen is esterified.

7. A drier comprising a soap of a drying metal and from about 2 to 12 parts per 100 parts of such drier soap of an acid of pentavalent phosphorus in which at least one hydrogen is esterified by an alcohol and there is at least one free acid-hydrogen.

8. A drier comprising a water-insoluble soap of a drying metal and from about 2 to 12 parts of mono-amyl acid orthophosphate per 100 parts of such drier soap.

9. A drier comprising a water-insoluble soap of a drying metal and from about 2 to 12 parts of mono-butyl acid orthophosphate per 100 parts of such drier soap.

10. A drier comprising a soap of a metal selected from the class consisting of lead, manganese, cobalt, zinc and iron, a soap of a metal selected from the class consisting of calcium, copper, cadmium, nickel, barium, strontium, and chromium and from about 2 to 12 parts per 100 parts of total soap of an acid of pentavalent phosphorus in which at least one hydrogen is esterified by an alcohol and there is at least one free acid hydrogen.

11. A drier comprising a water insoluble soap of a drying metal and from 2 to 12 parts per 100 parts of such drier soap of a salt of an acid of pentavalent phosphorus in which at least one hydrogen is esterified.

12. A drier comprising a water insoluble soap of a drying metal and from about 2 to 12 parts per 100 parts of such drier soap of a salt of an acid of pentavalent phosphorus in which at least one hydrogen is esterified by an alcohol and there is at least one hydrocarbon radical substituting hydrogen.

13. A drier comprising a water insoluble soap of a drying metal and a minor amount, based on the amount of such drier soap, of a substituted acid of pentavalent phosphorus in which at least one of the acid hydrogens has been replaced by a base and at least one other acid hydrogen is esterified.

14. A drier comprising a water insoluble soap of a drying metal and a minor amount, based on the amount of such drier soap, of a substituted acid of pentavalent phosphorus in which at least one of the acid hydrogens has been replaced by a metal and at least one other acid hydrogen is esterified.

15. A drier comprising a water insoluble soap of a drying metal and from about 2 to 12 parts per 100 parts of such drier soap of a substituted acid of pentavalent phosphorus in which at least one of the acid hydrogens has been replaced by a metal and a plurality of the remaining acid hydrogens have been esterified.

16. A drier comprising a soap of a metal selected from the class consisting of lead, manganese, cobalt, zinc and iron, a soap of a metal selected from the class consisting of calcium, copper, cadmium, nickel, barium, strontium and chromium, and from about 2 to 12 parts per 100 parts of total soap of a salt of an acid of pentavalent phosphorus in which at least one hydrogen is esterified.

17. A drier comprising a soap of a metal selected from the class consisting of lead, manganese, cobalt, zinc and iron, a soap of a metal selected from the class consisting of calcium, copper, cadmium, nickel, barium, strontium and chromium, and from about 2 to 12 parts per 100 parts of total soap of a metallic salt of an acid of pentavalent phosphorus in which at least one hydrogen is esterified.

18. A paint composition comprising a drying vehicle and a drier comprising a drier metal salt of an acid of pentavalent phosphorus in which at least one hydrogen is esterified.

STANLEY B. ELLIOTT.
RAYMOND J. O'HARA.

REFERENCES CITED

The following references are of record in the file of this patent:

UNITED STATES PATENTS

| Number | Name | Date |
|---|---|---|
| 2,095,508 | Meidert | Oct. 12, 1937 |
| 2,228,668 | Martin | Jan. 14, 1941 |
| 2,234,379 | Martin | Mar. 11, 1941 |
| 2,268,491 | Martin | Dec. 30, 1941 |
| 2,307,158 | Reynolds | Jan. 5, 1943 |